United States Patent [19]
Manuel, deceased

[11] 3,799,288
[45] Mar. 26, 1974

[54] ROTATABLE STAIR ASSEMBLY ADAPTED FOR ATTACHMENT TO A VEHICLE PLATFORM

[76] Inventor: Larry N. Manuel, deceased, late of 16611 Grand Dr., Bellflower, Calif. 90706 Ruby L. Manuel, administratrix

[22] Filed: May 17, 1972

[21] Appl. No.: 254,062

[52] U.S. Cl. .................................. 182/91, 182/95
[51] Int. Cl. ............................................. B60r 3/02
[58] Field of Search ...... 182/91, 95, 156, 159, 33.6; 280/163, 166

[56] References Cited
UNITED STATES PATENTS

| | | | |
|---|---|---|---|
| 3,627,350 | 12/1971 | Cross | 182/91 |
| 398,496 | 2/1889 | Cork | 182/91 |
| 1,305,281 | 6/1919 | Hall | 182/156 |
| 560,752 | 5/1896 | Prator | 182/206 |
| 2,197,266 | 4/1940 | Fredell | 182/91 |
| 3,394,947 | 7/1968 | Strube | 280/166 |

*Primary Examiner*—Reinaldo P. Machado

[57] ABSTRACT

A stair assembly attachable to a vehicle platform to provide one or more rotatably positionable stair members. The described stair assembly includes two stair members, four support arms, two brackets, hinge fasteners for hinge fastening the support arms to the brackets, and hinge fasteners for hinge fastening the stair members to the support arms.

6 Claims, 7 Drawing Figures

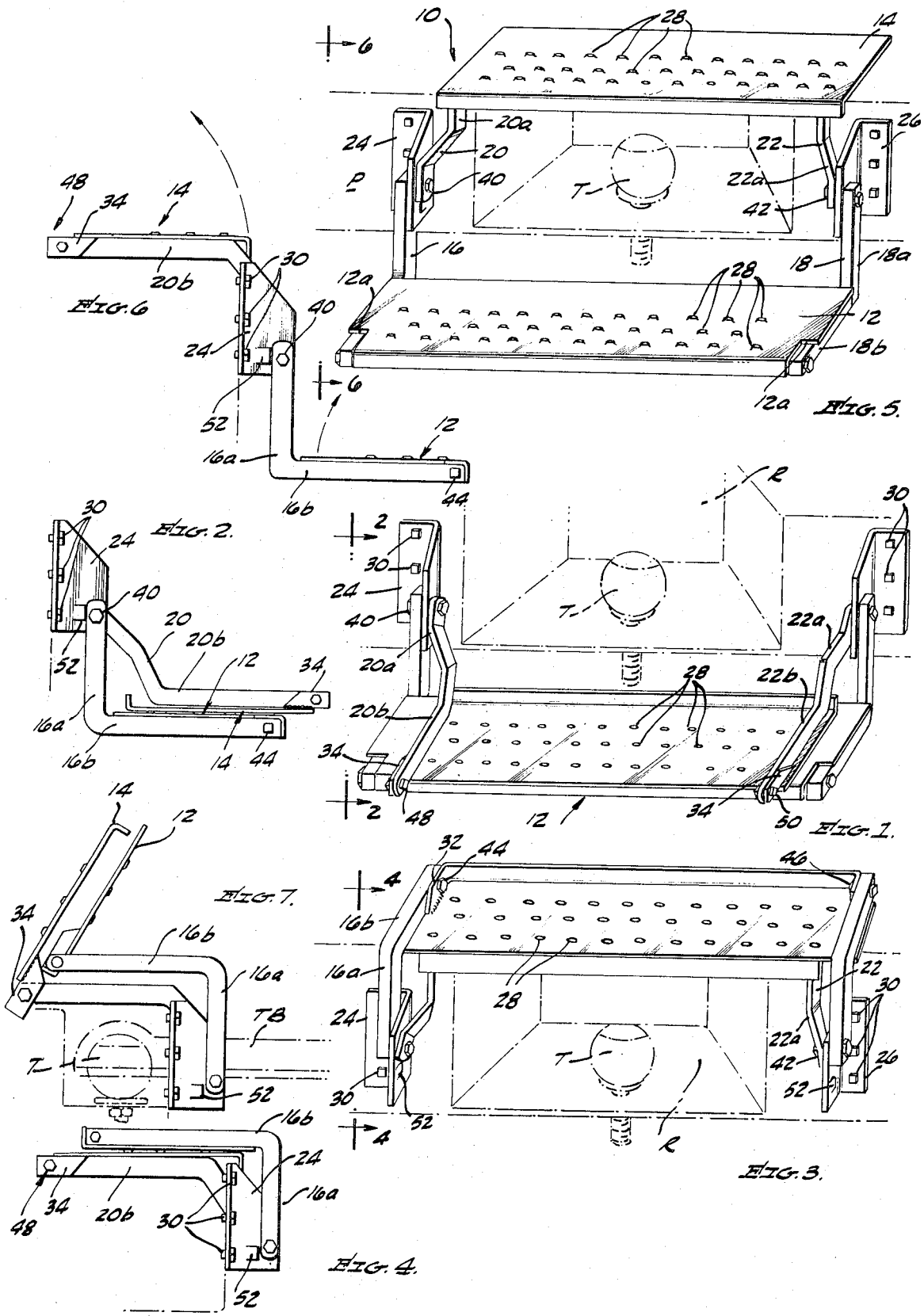

ROTATABLE STAIR ASSEMBLY ADAPTED FOR ATTACHMENT TO A VEHICLE PLATFORM

This invention relates to a rotatable stair assembly attachable to a vehicle platform to provide one or more rotatably positionable stair members.

Some vehicles have a platform to which it is desirable to attach a stairway. Thus, for example, vehicles such as campers and trailers in particular, often have a rear bumper platform behind a rear door in the vehicle that people use to enter and leave the vehicle. People who enter or leave the vehicle must step from the ground onto the platform or step off the platform onto the ground. A lot of these vehicles have a platform that includes a towball, for use in towing another vehicle, located in a recessed towball compartment in the center of the platform and directly behind the rear door of the vehicle.

It is somewhat inconvenient and not entirely safe for people to step onto and off the platform when going inside or outside the vehicle via the rear door thereof, because the platform is fairly high off the ground.

The inconvenience and safety hazard is greater in the instance of a vehicle platform having a towball located in the recessed portion of the platform. By providing a stairway at the platform, it is possible to reduce the inconvenience and safety hazards involved in the use of the platform in entering or leaving the vehicle.

In the past, stair assemblies of one form or another have been attached to the rear bumper platform of campers, trailers and the like for the purpose of providing a stairway between ground level and the top of the platform. One particular stair assembly that is in current use includes stair members that can be rotated to positions of nonuse when desired. These stair members can be rotatably positioned to allow for convenient hitching of a towed vehicle to a towball mounted on the vehicle platform.

The stair assemblies of the prior art are not entirely satisfactory. The particular stair assembly mentioned above, for example, is costly, mechanically overcomplicated, easy to misuse in a careless manner, and can be broken or otherwise damaged as the result of misuse.

The present invention provides a rotatable stair assembly adapted for attachment to a vehicle platform or the like and better suited for use than any prior rotatable stair assembly which can be used for substantially the same purposes. The rotatable stair assembly provided by the present invention includes, in one embodiment thereof, two stair members connected to support arms that are connected to mounting brackets. Each stair member is hinge connected to two support arms that are hinge connected to the two brackets of the assembly. The ends of each support arm are hinge fastened to a respective bracket or to a respective stair member by means of a bolt and locknut fastener arrangement.

The assembly of the present invention is especially useful when used in connection with the rear platform of a trailer or camper or other vehicle having a recess formed in the platform directly behind the foot of the doorway of the trailer or camper or the like and wherein the recess contains a towball mounted on the base of the recess so that another vehicle can be towed by fastening the front end of a towbar to the towball. The rotatable stair assembly of the present invention not only provides a stair member that may be positioned upon the top of the rear platform to cover the underlying platform recess to safeguard against the possibility of someone catching a foot on the towball, but also provides stair members that can be moved into inclined positions upon the top of the platform to make it possible for a tow bar to be readily fastened to the towball so as to project above the top of the platform.

The present invention provides a rotatable stair assembly comprising a first stair member, first and second support arms for supporting the first stair member, a second stair member, third and fourth support arms for supporting the second stair member, a first mounting bracket hinge connected to the first and third support arms by a bolt and lock nut fastener arrangement, a second mounting bracket hinge connected to the second and fourth support arms by a bolt and lock nut fastener arrangement, two bolt and lock nut fastener arrangements hinge connecting the first stair member to the two support arms that support such member, and two bolt and lock nut fastener arrangements hinge connecting the second stair member to the two support arms that support such member.

Accordingly, it is an object of this invention to provide an improved rotatable stair assembly of the type that includes assembly mounting brackets adapted for attaching the assembly to a vehicle platform or the like, and also includes at least one stair member hinge fastened to a pair of support arms that are hinge fastened to the mounting brackets.

It is another object of this invention to provide a rotatable stair assembly that includes two stair members each hinge fastened by bolt and lock nut fasteners to two corresponding support arms that are in turn hinge fastened by bolt and lock nut fasteners to two mounting brackets adapted for attaching the assembly to a vehicle platform or the like.

Another object of this invention is to provide an improved rotatable stair assembly particularly suited for convenient use in connection with the towing of a towed vehicle.

The above and other objects of the present invention, as well as advantages and features of the invention, will be made more clear upon review of the following discussion of an embodiment of the present invention taken in conjunction with the accompanying drawings.

BRIEF DESCRIPTION OF THE DRAWINGS

FIGS. 1, 3 and 5 are perspective views of a rotatable stair assembly, with two stair members, illustrated as being attached to a vehicle platform P (shown in phantom). FIG. 5 shows the two stair members of the assembly positioned to provide an inclined stairway. FIG. 3 shows the lower stair member positioned upside down upon the upper stair member. FIG. 1 shows the upper stair member positioned upside down upon the lower stair member.

FIGS. 2, 4, 6 and 7 are end elevation views of the assembly illustrated in FIGS. 1, 3 and 5. FIG. 2 is a view taken along line 2—2 of FIG. 1. FIG. 4 is a view taken along line 4—4 of FIG. 3. FIG. 6 is a view taken along line 6—6 of FIG. 5. FIG. 7 is an end elevation view showing the stair members of the stair assembly disposed in respective inclined positions when the stair members are not being utilized as stairs of a stairway.

DESCRIPTION OF AN EMBODIMENT OF THE PRESENT INVENTION

The figures of the accompanying drawing illustrate the use of a rotatable stair assembly 10 embodying the invention in combination with the rear bumper platform P of a camper vehicle. The assembly 10 includes two metal panel stair members 12, 14; support arms 16, 18 and 20, 22; and mounting brackets 24, 26. Support arms 16 and 18 are identical. Support arms 20 and 22 are mirror duplicates. Brackets 24 and 26 are mirror duplicates. Each arm 16, 18, 20, 22 includes a securement aperture at each end for a purpose to be described. As will be described, the stair members 12, 14 can be rotated with respect to the support 16, 18 and 22, 22 and the support arms 16, 18 and 20, 22 can be rotated with respect to the bracket 24, 26.

Each stair member 12, 14 is provided with rows of bumps 28 projecting from the topside thereof. The bumps 28 are centrally apertured circular bumps with a serrated peripheral edge formed by a metal stamping operation. These bumps provide, in an inexpensive way, a firm footing for anyone walking up or down the stair members 12 and 14. Due to the bumps 28 it is not as easy to slip on or fall from the stair members as it would be if the stair members 12, 14 had flat, bumpless topsides.

The support arm 16 includes an arm portion 16a and another arm portion 16b. The support arm 18 includes an arm portion 18a and another arm portion 18b. The support arm 20 includes an arm portion 20a and an arm portion 20b. The support arm 22 includes an arm portion 22a and an arm portion 22b. The portions of each arm 16, 18, 20 and 22 are perpendicular to each other. The arm portions 20a and 22a of the arms 20 and 22 bend away from the respective brackets 24 and 26.

The brackets 24 and 26 each include a base portion and a leg portion which is perpendicular to the base portion. The base portion of each bracket 24, 26 includes a row of three securement apertures and the leg portion of each bracket includes a single securement aperture.

In the views of FIGS. 1, 3 and 5 the assembly 10 is shown with the base portions of the brackets 24, 26 bolted to the side of the platform P by bolts 30 that are disposed in the aforementioned securement apertures to affix the assembly 10 to the platform p. In FIG. 5 the stair members 12 and 14 are shown as they are positioned to provide an inclined stairway attached to the platform P. The stair member 12 is supported on the arm portions 16b, 18b of the arms 16, 18 with the underside of the side portions of the stair member 12 resting on the arm portions 16b, 18b. The stair member 14 is supported on the arm portions 20b, 22b of the arms 20, 22 with the underside of the side portions of the stair member 14 resting on the arm portions 20b, 22b. The side portions of the stair member 12 are shorter than the arm portions 16b, 18b and include two lateral shoulders 12a.

The stair member 12, as shown in FIG. 3, includes two apertured metal portions 32, 32 welded to the underside of the stair member 12 near the opposite lateral sides thereof. The portions 32, 32 are located near the forward corners of the member 12. Two apertured metal members 34, 34 are welded to the underside of the stair member 14 near the opposite sides thereof and near the rearward corners thereof as is shown in FIG. 1.

The ends of the arm portions 16a and 20a of the arms 16 and 20 are connected to the bracket 24 by fastener 40 that includes a bolt and a lock nut. The fastener 40 serves to hinge or pivot the arms 16 and 20 to the bracket 24. The threaded shank of the bolt of the fastener 40 is seated in the securement apertures of the arm portions 16a, 20a and the leg portion of the bracket 24 with the lock nut of the fastener 40 tightened onto the shank threads. In this way, the arm portions 16a, 20c are fastened to the bracket 24 in such fashion that the arms 16, 20 can be rotated about the bracket 24.

The ends of the arm portions 18a and 22a of the arms 18 and 22 are connected to the bracket 26 by a fastener 42 that includes a bolt and a lock nut. The fastener 42 serves to hinge or pivot the arms 18 and 22 to the bracket 26. The threaded shank of the bolt of the fastener 42 is seated in the securement aperatures of the arm portions 18a and 22a and the leg portion of the bracket 26 with the lock nut of the fastener 42 tightened onto the shank threads. In this way, the arm portions 18a, 22a are fastened to the bracket 26 in such fashion that the arms 18, 22 can be rotated about the bracket 26.

The end of the arm portion 16b is connected to the stair member 12 by a fastener 44 and the end of the arm portion 18b is connected to the stair member 12 by a fastener 46. The fasteners 44 and 46 each include a bolt and a lock nut. The fastener 44 serves to hinge or pivot the stair member 12 to the arm 16 and the fastener 46 serves to hinge or pivot the stair member 12 to the arm 18. The threaded shank of the bolt of the fastener 44 is seated in the securement apertures of one metal portion 32 and arm portion 16b with the lock nut of the fastener 44 tightened onto the shank threads. In this way, the stair member 12 can be rotated about the end of the arm portion 16b. The threaded shank of the bolt of the fastener 46 is seated in the securement apertures of one metal portion 32 and arm portion 18b with the lock nut of the fastener 46 tightened onto the shank threads. In this way, the stair member 12 can be rotated about the end of the arm portion 18b.

The end of the arm portion 20b is connected to the stair member 14 by a fastener 48 and the end of the arm portion 22b is connected to the stair member 14 by a fastener 50. The fastener 48 and 50 each include a bolt and a lock nut. The fastener 48 serves to hinge or pivot the stair member 14 to the arm 20 and the fastener 50 serves to hinge or pivot the stair member 14 to the arm 22. The threaded shank of the bolt of the fastener 48 is seated in the securement apertures of one metal member 34 and arm portion 20b with the lock nut of the fastener 48 tightened onto the shank threads. In this way, the stair member 14 can be rotated about the end of the arm portion 20b. The threaded shank of the bolt of the fastener 46 is seated in the securement apertures of one metal member 34 and arm portion 22b with the lock nut tightened onto the shank threads. In this way, the stair member 14 can be rotated about the end of the arm portion 22b.

The fasteners 40, 42, 44, 46, 48 and 50 each utilize a lock nut that self locks into place on the corresponding bolt so that the parts that are fastened together by each fastener are captured between the lock nut and the head of the corresponding bolt. The self locking action of each lock nut enables one to adjust distance between the lock not and corresponding bolt head so that the parts captured between the lock nut and bolt head can be freely rotated with respect to each other.

Each bracket 24, 26 includes an integral lug 52, stamped out of the bracket leg portion, provided to abut one side of the respective leg portions 16b, 18b when the stair member 12 is positioned as shown in FIG. 5 to maintain the support arms 16, 18 in the position shown in FIG. 5. The lug 52 of the bracket 24 is located as shown in FIGS. 2, 4, 6, and 7; the lug 52 of the bracket 26 being similarly located on the bracket leg portion thereof.

As shown in FIGS. 1 and 2, the support arms 20 and 22 can be pivotted about the brackets 24 and 26 to position the stair member 14 upside down upon the stair member 12. As shown in FIGS. 3 and 4, the support arms 16 and 18 can be pivotted about the brackets 24 and 26 to position the stair member 12 upside down upon the stair member 14. As shown in FIG. 7, the stair member 12 and 14 can be pivotted about the support arms 16, 18 and 20, 22 to position the stair members 12 and 14 in respective inclined positions wherein the underside of the stair member 12 faces the underside of the stair member 14. When the stair member 12 is positioned as shown in FIG. 7, the shoulders 12a of member 12 respectively abut the arm portions 16b, 18b of the arms 16, 18 to maintain the member 12 in the inclined position.

In the figures, the platform P includes top and rear side surfaces that form a recess R wherein a towball T is disposed. One advantage of the assembly 10 is that the stair members 12, 14 are positionable as shown in FIGS. 5 and 3 to provide a stair surface over the recess R and towball T. The provision of this stair surface is a safety feature that greatly reduces the likelihood of an accident or injury occurring to someone stepping onto or off the platform P.

A substantial advantage of the described stair assembly 10 is the ease with which it is used. The stair members 12, 14 can easily be moved into any of the stair member positions shown in the figures. This ease of use is especially advantageous whenever it is desired to attach a towbar TB in the manner indicated in phantom in FIG. 7, to the towball T or, conversely, whenever it is desired to detach the towbar TB from the towball B and utilize the assembly 10 as an inclined stairway. For example, assuming the stairmembers 12, 14 are positioned as shown in FIG. 5, the towbar TB can be attached to the towball T by first positioning the stair members 12, 14 in the positions shown in FIG. 7 and then proceeding to attach the towbar TB to the towball B in the usual manner. To reposition the stair members from the FIG. 5 to the FIG. 7 position, the stair member 14 is merely rotated about an axis passing through the fasteners 48 and 50 to dispose the stair member 14 as shown in FIG. 7; the stair member 12 is brought to its FIG. 7 position by rotating the support arms 16, 18 upward about an axis passing through the fasteners 40 and 42 and by rotating the stair member 12 relative to the support arms 16, 18 about an axis passing through the fasteners 44 and 46 until the shoulders 12a abut the arm portions 16b, 18b.

Although the best mode contemplated for carrying out the present invention has been herein shown and described, it will be apparent that modification and variation may be made without departing from what is regarded to be the subject matter of the invention.

What is claimed is:

1. In a rotatable stair assembly, the combination comprising;
a first stair member, a second stair member, a first support arm, a second support arm, a third support arm, and a fourth support arm, a first mounting bracket, and a second mounting bracket;
each support arm having a first arm portion and a second arm portion that is perpendicular to said first arm portion thereof, each support arm having a first end at the end of said first arm portion and further having a second end at the end of said second arm portion;
a first coupling means for rotatably coupling said first end of said first support arm to said first bracket, a second coupling means for rotatably coupling said first end of said second support arm to said second bracket, a third coupling means for rotatably coupling said second end of said first support arm to said first stair member, and fourth coupling means for rotatably coupling said second end of said second support arm to said first stair member;
a fifth coupling means for rotatably coupling said first end of said third support arm to said first bracket, a sixth coupling means for rotatably coupling said first end of said fourth support arm to said second bracket, a seventh coupling means for rotatably coupling said second end of said third support arm to said second stair member, and an eighth means for rotatably coupling said second end of said fourth support arm to said second stair member.

2. The combination set forth in claim 1 wherein each stair member includes a first lateral portion and a second lateral portion situated at opposite lateral sides thereof, each stair member including a forward portion and a rearward portion, the second end of the first arm and the second end of the second arm being rotatably coupled to the rearward portion of the first stair member, the second end of the third arm and the second end of the fourth arm being rotatably coupled to the forward portion of the second stair member, the second arm portions of said first arm and said second arm being arranged to operatively support said first lateral portion and said second lateral portion of said first stair member, and the second arm portions of said third arm and said fourth arm being arranged to operatively support said first lateral portion and said second lateral portion of second stair member.

3. The combination set forth in claim 1 wherein said first coupling means and said fifth coupling means include a bolt and nut common to each and wherein said second coupling means and said sixth coupling means include a bolt and nut common to each.

4. The combination set forth in claim 1 wherein each bracket includes a base portion adapted for attachment to one side of a platform and further includes a leg portion oriented perpendicular to the base portion and adapted for rotatable coupling thereto of the first ends of the corresponding support arms.

5. The combination set forth in claim 1 further comprising bumps formed in each of said stair members.

6. The combination set forth in claim 1 wherein each bracket includes a stop formation, the stop formation of the first bracket being located thereon to operatively abut the first arm portion of the third arm, the stop formation of the second bracket being located thereon to operatively abut the first arm portion of the fourth arm, the stop formations operatively abutting the first arm portions of the third and fourth arms to thereby maintain the second arm portions of the third and fourth arms in a horizontal plane.

* * * * *